United States Patent [19]

Kaller

[11] 3,874,679

[45] Apr. 1, 1975

[54] SEALING DEVICE

[76] Inventor: Sigurd Kaller, Vadursgaten 2A, S-582 45 Linkoping, Sweden

[22] Filed: Nov. 1, 1973

[21] Appl. No.: 411,879

[30] Foreign Application Priority Data
Nov. 3, 1972 Sweden............................ 14281/72
June 12, 1973 Sweden............................ 7308258

[52] U.S. Cl. .................................. 277/37, 277/165
[51] Int. Cl. ............................................ F16j 15/18
[58] Field of Search ......... 277/37, 17, 59, 123, 124, 277/125, 135, 165, 195, 218

[56] References Cited
UNITED STATES PATENTS

| | | | |
|---|---|---|---|
| 410,918 | 9/1889 | Philper | 277/195 |
| 572,910 | 12/1896 | Rigby | 277/124 |
| 974,949 | 11/1910 | Brousseau | 277/123 |
| 990,841 | 5/1911 | Collins | 277/123 |
| 1,757,311 | 5/1930 | Kahle | 277/59 |
| 2,126,007 | 8/1938 | Guiberson et al. | 277/123 |
| 2,369,883 | 2/1945 | Coopey | 277/135 |
| 2,957,712 | 10/1960 | Farmer | 277/124 |
| 3,331,609 | 7/1967 | Moran | 277/165 |
| 2,511,109 | 6/1950 | Haskell | 277/125 |
| 3,608,912 | 9/1971 | Templin | 277/123 |

Primary Examiner—Robert I. Smith
Attorney, Agent, or Firm—Sughrue, Rothwell, Mion, Zinn and Macpeak

[57] ABSTRACT

The invention disclosed relates to a sealing device which is applied between two elements, movable in relation to each other and intended to prevent leakage of high pressure fluids or other media between a high pressure side and one of low pressure. The device disclosed comprises a ring assembly having a number of circular sealing rings compressed against a surface of revolution of at least one element. The rings are pressed against each other by a compression force and each has an open slit for flexible movement and contact relative to the surface. The slits in the sealing rings are displaced in relation to each other and a sleeve of resilient material tightly surrounds the sealing rings, pressing radially against the sealing rings under the influence of compressive forces.

5 Claims, 5 Drawing Figures

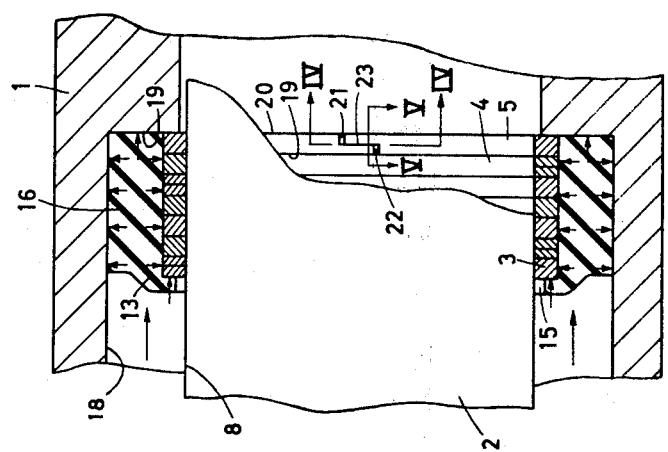
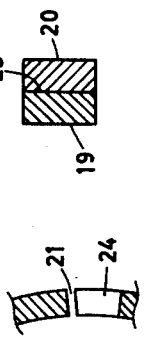
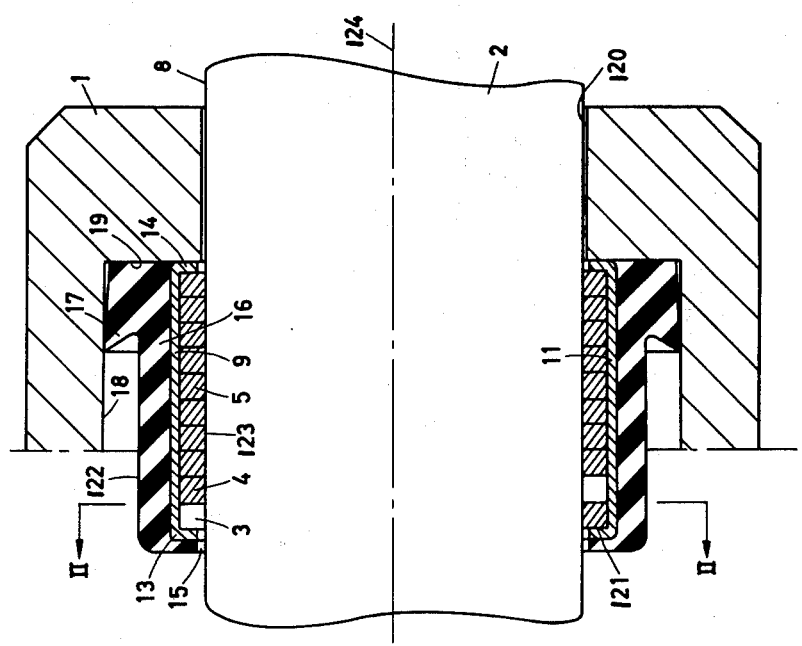

SEALING DEVICE

The invention relates to a sealing device which is applied between two elements, movable in relation to each other, and intended to prevent leakage of high pressure medium between a high pressure side and a low pressure side. The device includes a ring assembly having a plurality of circular sealing rings adapted against a surface of revolution of at least the one element, the rings being pressed against each other by a compression force, and each having an open slit for flexibly being in contact with said surface, whereon the slits in the sealing rings are displaced in relation to each other, there being a sleeve of resilient material tightly surrounding the sealing rings, pressing radially against the sealing rings under the influence of compressive forces.

In a known device of this kind, spring elements or the like are used to accomplish an axial compressive force, and the sleeve is surrounded by a pressure means which is independent of said high pressure medium. To attain effective sealing, both the springs and said pressure means must constantly apply forces on the rings corresponding to the maximum surge pressures, usually of short duration, acting in the high pressure medium. This causes both design difficulties and large wear on the sealing rings.

The purpose of the invention is therefore to accomplish a device with a sealing pressure dependent on the high pressure medium, and which at even extremely high pressures, e g 350 bars, has completely negligable leakage, while retaining its sealing characteristics even after long use.

This purpose is completely realized by the sealing device as defined in the patent claims.

The invention is described below, using an embodiment in conjunction with the appended drawing, on which FIG. 1 shows an axial section through a sealing device according to the invention, FIG. 2 a section along line II—II in FIG. 1, FIG. 3 is an axial section through a modified embodiment of the invention, FIG. 4 is a section along the line IV—IV in FIG. 3, and FIG. 5 is a section along the line V—V in FIG. 3.

The embodiment of the invention shown in FIG. 1 and 2 is used in connection with a high pressure gas cylinder 1 and a reciprocating shaft 2. Shaft 2 is cylindrical, and a plurality of sealing rings, e g sealing rings 3, 4 and 5 are in contact with its cylindrical surface. The ten sealing rings shown on the drawing have only been chosen as an example, and any number whatsoever can be adapted dependent on sealing demands. Each sealing ring 3, 4, 5 is of conventional piston ring type, i.e. provided with an open slit 6 (FIG. 2), wherewith it can be pressed together, with its inner circular surface 7 in sealing contact with the cylindrical surface 8 of the shaft 2. Slits 6, in the sealing rings, are dip displaced relative to each other around the circumference of shaft 2, and the sealing rings are axially displaceable to each other so that they can be brought into good contact with each other, there being hereby no direct gas communication in the pack formed by the sealing rings. In the embodiment illustrated, the sealing rings are kept together by a keeper consisting of narrow metal strips 9, 10, 11 and 12, the ends of which are joined to circular flanges 13 and 14. The circular flanges only extend radially inwards a portion of the outer sealing rings, and the gap 15 between shaft 2 and the inner edge of flange 13 should be as large as possible. Suitably, there is also play between the inside of the flanges and the adjacent sealing rings.

According to the invention, the entire sealing ring pack is surrounded by an impermeable sleeve 16 of a resilient material. The sleeve 16 is shown on the drawing as being provided with a circular sealing lip 17, in sealing contact with the inner wall 18 of the cylinder 1. The rear portion of the sleeve 16 is in contact with the end wall 19 of cylinder 1. The shaft 2 goes through an opening 20 in the end wall 19. It is assumed that a high gas pressure, e.g. 350 bars prevails in the interior of cylinder 1, and that outside the cylinder there is a comparatively low pressure, e.g. atmospheric pressure.

Via gap 15, the high gas pressure in cylinder 1 will act on surface 121 of adjacent ring 3, to press ring 3 against the remaining sealing rings in the sealing ring pack with a force partly depending on the gas pressure and partly on the area of ring 3 exposed to gas pressure. The sealing ring lying furthest to the right in FIG. 1 will thereby be pressed against the keeper flange 14 or if there is no keeper flange for the sealing rings, against the end wall 19. As the slits 6 of the sealing rings do not lie in line with each other, as has already been mentioned, no gas leakage can take place through the pack.

The outer cylindrical surface 122 of the sleeve 16 is freely exposed to the high pressure gas and will therefore, as it consists of a resilient material such as rubber or plastic, be pressed against the sealing rings, e.g. rings 3, 4 and 5, keeping their inner sealing surfaces, e.g. sealing surface 123, in gas-tight contact with surface 8 of the shaft.

The total compressive force applied by sleeve 16 against the sealing rings is dependent on the material chosen for the sleeve, and its thickness, the values of these magnitudes being so chosen, depending on the working pressure, that the intended superficial force between the sealing rings and surface 8 of shaft 2 is maintained.

The sealing rings may comprise of whatever suitable material at all, such as metal or plastic. In the latter case, a carbon filled PFTE is suitable for example.

As mentioned, the sleeve 16, sealingly in contact with the sealing rings may consist of a plastic or rubber. A suitable material is nitrile rubber, which at high pressures may be considered as a viscous liquid. Nitrile rubber sleeves, and sleeves of other material with the characteristics mentioned, adjust themselves completely to the underlying surface, and each sealing ring will therefore be kept pressed against shaft 2 so that perfect contact is obtained. In practice, the rings are thus pressed individually against the co-acting surface portion of the shaft, and thereby relatively large surface tolerances can be accepted on surface 8 without the sealing function deteriorating.

In the event of the inner surface of a sealing ring, preferably a high finished inner surface, being damaged by particles forcing their way into the sealing device, the sealing function will not be disturbed to any notable degree, as adjacent sealing rings completely isolate the damage. Neither will cavities in the surface 8 of the shaft notably affect the sealing function, as each such cavity will be completely surrounded by adjacent sealing rings in the pack.

The described embodiment of the sealing device has been demonstrated in conjunction with a cylinder and a reciprocating shaft, but the invention is not limited to such an application, and can also be used for sealing two elements rotating relative to each other. Similarly, both elements 1 and 2 may be movable. Element 1 can rotate, and element 2 can make a reciprocating movement as described. In this case a sealing device of the kind described is adapted in sealing communication with surface 18.

As has been previously mentioned, the keeper flange 9-14 can be left out and sleeve 16 may further be suitably molded on a sealing ring assembly. The rectangular open sealing rings shown in cross-section may further be replaced with open sealing rings having another suitable cross-section. As the sealing rings in the pack are individually compressible in a radial direction, the sealing device can be applied to non-cylindrical surfaces, and surface 8 can thus be conical, whereas the contact surface of each sealing ring has a corresponding conical shape. Sealing devices according to the invention may consequently be suited to any elements whatsoever having a surface of rotation about an axis 124 (FIG. 1).

To accomplish the best possible transference of force from sleeve 16 to the outer pressure-receiving surfaces of the sealing rings, it is suitable to arrange these surfaces in one and the same plane of rotation about axis 124.

In the embodiment set forth above, a pure gas sealing has been described, but the invention is just as well suited to sealing against other media, e.g. high pressure hydraulic fluid.

In the sealing device shown in FIG. 1-2, rings are used having a completely open slit, i.e. the rings are of conventional piston ring type, and this means that the outer ring against the high pressure medium must be sealed with an adjacent ring to take up pressure, as the slit is open. The open slits also mean that the rings must be turned in relation to each other so that the slits do not coincide and form a through passage. This disadvantage is circumvented by the embodiment according to FIGS. 3-5.

The embodiment of the invention shown in FIG. 3 is used in connection with a high pressure gas cylinder having a reciprocating cylindrical shaft 2. A plurality of sealing rings, sealing rings 3, 4 and 5 for example, are in contact with the cylindrical surface 8 of the shaft 2. The number of sealing rings varies, depending on pressure conditions, pressure medium, etc. The whole of the ring assembly formed by the sealing rings is surrounded by an impermeable sleeve 16 made from a resilient material, e.g. rubber or plastic. The sleeve 16 is pressed against the inner wall 18 of cylinder 1 and thus presses the split rings against shaft 2 with a certain amount of pretentioning. The end of sleeve 16 towards the interior of cylinder 1 has a ring flange 13 extending over the side surface on the inner sealing ring 3, facing the interior of the cylinder. Between the surface 8 of the shaft 2, and the ring flange 13 there is a circular gap 15 whereby the high pressure medium in cylinder 1 acts on said side surface of the ring and presses ring 3 axially towards the remaining rings. Ring 5 is in contact with an engaging surface 19 towards the exterior of cylinder 1 in the embodiment illustrated in FIG. 3.

With prevailing high pressure on the inside of the cylinder, the resilient sealing sleeve 16 takes on a plastic condition and radial compression forces are therefore transmitted to the sealing rings which are thereby pressed against the surface 8 of shaft 2.

The sealing device is thus affected by radial and axial forces which are directly dependent on the momentarily prevailing pressure on the high pressure side, and the contact pressure between the respective ring and the shaft surface co-acting therewith is automatically suited to requirements, whereas wear is kept to a minimum and perfect sealing function is obtained. As axial pressure against the rings is at the same time dependent on the high pressure medium, the rings are pressed against each other with sufficiently large force to prevent the sleeve material flowing down between the rings at extreme high pressure.

In the sealing device shown in FIGS. 1 and 2, split sealing rings of conventional type are used, i e rings which have been parted by a slit going through the ring in one plane. This means that the slit in the first ring adjacent the high pressure side must be sealed by a side surface on the next ring in sequence, thus two rings must be used to transfer the axial compression force to remaining rings. The first ring is not pressed further against the next ring in sequence with sufficient sealing force, and this may mean that the high pressure medium leaks in between the side surfaces facing each other. If this happens, the first sealing ring has completely lost its function as a transmitting means for axial force, and the second and third rings must then take over this function. As great demands are placed on the sealing device, a comparatively large number of rings must therefore be arranged, 10-15 rings for example, causing the sealing device to be comparatively long.

In the embodiment according to FIGS. 3-5, at least ring 3 adjacent the high pressure medium, and preferably all the sealing rings, is therefore parted in a manner as described below.

The sealing rings have side surfaces 19 and 20, parallel to each other and having highly finished surfaces for good sealing. The side surface 20 on a ring, ring 4 for example, is thus pressed against the side surface 19 on the ring nearest in sequence, by the generated axial force, and no high pressure medium can leak out between the side surfaces.

The rings or ring according to the invention are parted by a first slot 21, extending from side surface 20 inwards towards the middle of the ring, and a second slot 22 extending from the side surface 19 inwards towards the middle of the ring. The circular portion of the ring between both the slots 21 and 22 is cut through by a slit 23 which unites slots 21 and 22 with each other. The slots 21 and 22 are made sufficiently wide for obtaining the necessary compression of the rings. The depth of the slots is not critical, and neither is their direction. Thus each slot can extend much closer to the opposite side surface than is shown on the drawing, and there is no demand for parallel side walls in the slots, as their only function is to permit a certain amount of expansion and compression of the ring.

On the other hand, it is essential that the slit 23 lies in one plane which is absolutely parallel with the planes of the side surfaces 19 and 20, and that the inner surfaces of the slit in contact with each other, slit surface 24 for example, are well adjusted to each other so that good sealing is obtained. In making the slit 23, no portion of the respective side surface 19, 20 may of course be displaced from its surface plane, and it may be necessary to grind the ring flat after the slit 23 has been made, as the removal of material is unavoidable.

When the ring 3 facing the high pressure side is made according to the invention, this ring by itself will be able to transmit the axial pressure, as there is no leakage through the ring.

To avoid the lining-up of consequent rings with each other, these are suitably made in the same way.

The embodiment of the sealing device shown has only been chosen to illustrate the invention, and a number of modifications are possible within the framework for the patent claims.

I claim:

1. A sealing device which is applied between two elements (1, 2), movable in relation to each other, and intended to prevent leakage of high pressure medium between a high pressure side and a low pressure side, the device includes a ring assembly having a plurality of circular sealing rings engaging a surface (8) of revolution of at least the one element (2), the rings (3, 4, 5) being pressed against each other by a compression source, and having an open slit (6) to provide flexibility in said ring relative to said surface, whereon the slits (6) in the sealing rings are angularly displaced in relation to each other, and a sleeve (16) of resilient material tightly surrounding the sealing rings (3, 4, 5) and pressing radially against the sealing rings (3, 4, 5) under the influence of compressive forces, characterized in that at least the outer sealing ring in the ring assembly is adapted to be acted on by the high pressure medium in a direction towards the remaining sealing rings, and that the radial compression forces acting on the sleeve are brought about by the said high pressure medium.

2. Sealing device according to claim 1, characterized in that between the sealing rings (3, 4, 5) and the sleeve (16) there are longitudinal, axially directed retaining means (9–12) for keeping the sealing rings together.

3. Sealing device according to claim 1, characterized in that said outer sealing ring 3 is parted by a first slot (21) from the one planar side surface (20) of the ring towards the middle of the ring, a second slot (22) from the other planar surface (19) of the ring towards the middle of the ring, both slots being radially displaced from each other, and that the circular portion between both slots is cut by a slit (23) in a plane which is parallel with both said side surfaces, parallel with each other, of the sealing ring, said slit (23) extending between and into both the slots (21, 22) and having surfaces (24) in sealing contact with each other.

4. Sealing device according to claim 3, characterized in that the slots (21, 22) lie in planes at right angles to both the planar parallel side surfaces (19, 20) of the sealing ring.

5. Sealing device according to claim 4, characterized in that all rings (3, 4, 5) are identical with the said outer ring.

* * * * *